United States Patent
König (10) Patent No.: US 12,185,190 B2
(45) Date of Patent: Dec. 31, 2024

(54) COMPUTER-IMPLEMENTED METHOD FOR ANALYZING A NETWORK COMPRISING A PLURALITY OF ADS-B BASE STATIONS, NETWORK, AND EVALUATION DEVICE

(71) Applicant: Thales Italia S.p.A., Florence (IT)

(72) Inventor: Alexander König, Stuttgart (DE)

(73) Assignee: Thales Italia S.p.A., Florence (IT)

( * ) Notice: Subject to any disclaimer, the term of this patent is extended or adjusted under 35 U.S.C. 154(b) by 50 days.

(21) Appl. No.: 17/366,391

(22) Filed: Jul. 2, 2021

(65) Prior Publication Data
US 2022/0007147 A1 Jan. 6, 2022

(30) Foreign Application Priority Data
Jul. 2, 2020 (EP) .................. 20 183 801.8

(51) Int. Cl.
*H04W 4/029* (2018.01)
*G01S 5/02* (2010.01)
*G01S 5/06* (2006.01)

(52) U.S. Cl.
CPC ........... *H04W 4/029* (2018.02); *G01S 5/0244* (2020.05); *G01S 5/06* (2013.01)

(58) Field of Classification Search
CPC ..... H04W 4/029; H04W 24/02; H04W 64/00; G01S 5/0244; G01S 5/06; G01S 5/021; G01S 5/02213; G08G 5/0013; G08G 5/0026; G08G 5/0043
See application file for complete search history.

(56) References Cited

U.S. PATENT DOCUMENTS 9,274,220 B2 * 3/2016 Revol .................. G01S 5/021
2014/0185518 A1 * 7/2014 Ramakrishnan ........ H04W 4/02
370/328

FOREIGN PATENT DOCUMENTS

JP 2020094850 A * 6/2020

OTHER PUBLICATIONS

"An Alternative Positioning Navigation and Timing Concept based on Diverse Ranging" Ryan Wu, Sean A. Davidson May 5, 2014, pp. 886-914.

(Continued)

*Primary Examiner* — Umair Ahsan
(74) *Attorney, Agent, or Firm* — BOND, SCHOENECK & KING, PLLC; George R. McGuire (57) ABSTRACT

A computer-implemented method for analyzing a network having a plurality of ADS-B base stations, including the following steps: a. receiving an ADS-B signal from a transmitter located in a first geographic area at a first base station and determining a first arrival time of the signal at the first base station; b. extracting position information from the ADS-B signal; c. determining an expected second arrival time of the ADS-B signal at a second base station using the extracted position information, the position of the first base station and the position of the second base station and the first arrival time; d. determining a quantity characterizing an error from a comparison of the expected second arrival time with an actual second arrival time; e. performing steps a-d for the same ADS-B signal from the same transmitter and further pairs of first and second base stations of the network; and f. tagging a base station if the error related to that base station is significant.

12 Claims, 5 Drawing Sheets

(56) References Cited

OTHER PUBLICATIONS

"En-route Multilateration System Based on ADS-B and TDOA/AOA for Flight Surveillance Systems" Zhao, et al. May 25, 2020, pp. 1-6.
"Correction of systematic errors in Wide Area Multilateration" Abbud, et al. Sep. 12, 2011, pp. 173-178.
European Search Report, Dec. 3, 2020, pp. 1-11.

* cited by examiner

| | ERR | | | | |
|---|---|---|---|---|---|
| | A | B | C | D | n |
| A | - | 7 | 0 | 2 | 1 |
| B | 7 | - | 8 | 9 | 3 |
| C | 0 | 7 | - | 1 | 1 |
| D | 2 | 9 | 1 | - | 1 |
| Avg | 1 | - | 0,5 | 1,5 | |

COMPUTER-IMPLEMENTED METHOD FOR ANALYZING A NETWORK COMPRISING A PLURALITY OF ADS-B BASE STATIONS, NETWORK, AND EVALUATION DEVICE

CROSS-REFERENCE TO RELATED APPLICATIONS

This application claims priority to European Patent Application No. 20 183 801.8-1206 filed on Jul. 2, 2020, the disclosure which is incorporated herein by reference in its entireties.

BACKGROUND

The present invention refers to a computer-implemented method for analyzing a network comprising a plurality of ADS-B base stations, to a network comprising a plurality of ADS-B base stations and comprising an evaluation device, and an evaluation device according to the preambles of the independent claims.

Surveillance systems in air traffic control are typically designed to determine and/or measure horizontal position of aircraft. For example, automatic dependent surveillance—broadcast (ADS-B) is a surveillance technology in which an aircraft determines its position for example via satellite navigation and periodically broadcasts it, enabling the aircraft to be tracked. The information can be received by air traffic control ground stations ("base stations").

Multilateration (MLAT) is an aircraft surveillance technology based on the so called time difference of arrival (TDOA) principle. A plurality of ground receiving stations ("base stations") listens to signals transmitted from an aircraft. The two-dimensional horizontal location of the aircraft is mathematically calculated as the intersection of hyperboloids calculated from the measured time differences of arrival of a same signal received at different ground receiving stations.

In many applications, MLAT and ADS-B are used simultaneously, and MLAT is often used in order to monitor the ADS-B position of a target. In such cases the same signal is used redundantly by two different physical principles in order to determine the position of the transmitter. This considerably enhances safety, because for example ADS-B signals with wrong position information may be identified. However, MLAT is subject to some constraints. When MLAT shall be used for determining the position of targets on the ground, for example on a runway, taxiway, and/or apron of an airport, signal reflection or blockage by buildings or moving objects such as other aircrafts or vehicles may lead to errors of the MLAT position of the target.

Furthermore, it is known that contributing ground receiving stations of an airport MLAT system may be tuned in order to work around reflection induced timing errors. For example, tuning may be performed through visual inspection of the localization performance. However, such a visual inspection impacts the installation cost of the network and can lead to sub-optimal results.

It is therefore an object of the present invention to provide an automatic method and a network which allow to easily and automatically optimize the network and the localization performance of the MLAT system.

SUMMARY OF THE INVENTION

In order to solve this object the present invention proposes a method and a network comprising the features of the independent claims. Advantageous embodiments of the invention are claimed in the dependent claims.

According to the inventive method, high-quality position information derived from the signals received from ADS-B equipped targets is used in an automated process in order to identify areas where the reception of the signal by a specific receiver (base station) is impacted by buildings or other obstacles. This allows to automatically adapt the configuration of the MLAT system in the case that a receiver's contribution for a specific area is identified as defective. The possibility to apply an automated method may decrease deployment costs significantly.

Specifically, according to the invention a computer-implemented method for analyzing a network is proposed. The network comprises a plurality of ADS-B base stations which are designed to receive ADS-B signals emitted by ADS-B transmitters. The network also comprises an evaluation device which uses a same signal which is received by different base stations for multilateration. The inventive method may be carried out by the evaluation device and comprises the following steps:

(a) Receiving an ADS-B signal from a transmitter located in a first geographic area at a first base station and determining a first arrival time of the signal at the first base station. Typically, for determining the arrival times of a specific signal a synchronized clock system is used by all base stations of the network.

(b) Extracting position information from the ADS-B signal. It is to be understood that the ADS-B signal may comprise additional information, such as an identifier which allows to identify the transmitter, altitude information, speed information, position accuracy information, etc., which may be extracted as well.

(c) Determining an expected second arrival time of the ADS-B signal at a second base station using the extracted position information, the position of the first base station, the position of the second base station and the first arrival time. This is a simple arithmetic operation using the known speed of radio waves and the known distance between the first base station and the target as well as the known distance between the target and the second base station.

(d) Determining a quantity characterizing an error from a comparison of the expected second arrival time with an actual second arrival time. For example, the quantity may be an absolute or relative difference, or it may be an error class based on the absolute or relative difference. If there is no error at all, the difference between the expected second arrival time and the actual second arrival time would be 0. However, the bigger the difference is the more it can be assumed that either between the target and the first base station or between the target and the second base station a misleading reflection or blockage of the ADS-B signal occurred.

(e) Performing steps a-d for the same ADS-B signal from the same transmitter and further pairs of first and second base stations of the network. This allows to identify at the end whether in step d it was the first base station or the second base station (or both) which received a reflected or blocked signal.

(f) Tagging a base station if the error related to that base station is significant. "Tagging" may mean, by way of example, that the base station may receive a sort of virtual marking which indicates to a user that this base station has a problem with contributing to the determination of the position of the transmitter by means of multilateration in a sufficiently reliable way if the transmitter is located in the first geographic area. "Significant" may mean, by way of example, that the error or the quantity characterizing the error, respectively, has reached and/or has surpassed a threshold.

According to a preferred embodiment accuracy information on the position information is extracted from the ADS-B signal, and the ADS-B signal is not used for the above mentioned method steps c-f if the accuracy information reaches and/or passes a threshold. This improves the reliability of the inventive method, because only such ADS-B signals are used for multilateration which provide a sufficient accuracy of the extracted position information.

According to a preferred embodiment a velocity of the transmitter is determined from successive ADS-B signals, and wherein the ADS-B signal is not used for the steps c-f if the determined velocity reaches or exceeds a limit value. This embodiment takes into account that a relatively high speed of the transmitter/target may lead to erroneous multilateration results, since the higher the speed the more historic is the transmitted position. By consequence, this embodiment further improves the reliability of the inventive method.

According to a preferred embodiment the ADS-B signal is not used if (a) it is not an ADS-B signal from a plurality of ADS-B signals successively transmitted by the transmitter and/or if (b) the plurality reaches or falls below a limit value. Both options are based on the perception that the reliability and precision of occasional transmissions of ADS-B signals is often reduced and thus may reduce the reliability of the inventive method. By consequence, this embodiment further improves the reliability of the inventive method.

According to a preferred embodiment the ADS-B signal is not used if an average difference between a plurality of extracted position information of the ADS-B signal of the transmitter and position information of the transmitter determined by multilateration reaches or exceeds a limit value. With this embodiment a type of "offset" between the extracted position and the position determined by means of multilateration is discovered. Such an offset may be a hint to a non-precise ADS-B position information.

According to a preferred embodiment in step f a matrix of the quantities characterizing the error is formed for the pairs of base stations used and a significance is assumed for a base station if the quantity for at least n pairs of this base station with other base stations reaches or exceeds a limit value. This is an evaluation method which is easy to perform and which allows to clearly identify base stations for which the error is significant.

According to a preferred embodiment for each of the untagged base stations an average value of the quantities characterizing the error is determined and those base stations whose average value reaches or exceeds a limit value are tagged. With this embodiment further base stations can be identified which cannot reliably contribute to MLAT position determination when the transmitter is located in the first geographic area.

According to a preferred embodiment a tagged base station is not used for a position determination by means of multilateration of a transmitter located in the first geographical area. By consequence, an erroneous identification of an ADS-B signal as being wrong, for example as being spoofed, is prevented.

According to a preferred embodiment the method is carried out for a plurality of geographical areas and wherein only those base stations are used for multilateration in a specific geographic area which are not tagged in this area. Preferably, the geographical areas are formed as a grid, and whenever the transmitter is in a specific grid, only those base stations are used for multilateration which have been previously approved, that is which are non-tagged for this geographical area.

According to a preferred embodiment the method is performed immediately after an initial start-up of the network. By doing so, the network is readily set up and in a condition which allows to reliably determine the position of a target simultaneously by means of multilateration and by means of the position information extracted from the ADS-B signal.

According to a preferred embodiment the method is carried out repeatedly during normal operation of the network, and it is determined that a base station has been tagged which was previously untagged and/or when it is determined that a base station is no longer tagged which was previously tagged, a message is issued. With this particularly preferred embodiment it is possible to also identify during normal operation of the network only temporarily existing reflections or blockages, which may be caused for example by moving objects, such as trucks, construction sites or other aircraft. With this further embodiment, the reliability of the network during normal operation is further enhanced.

The invention also relates to a network comprising a plurality of ADS-B base stations and comprising an evaluation device. The evaluation device comprises a microprocessor and a storage device for storing executable program code. It is to be understood that, of course, this encompasses that the evaluation device comprises a plurality of microprocessors and also a plurality of storage devices. It is also to be understood that the evaluation device is connected to all ADS-B base stations, which allows the evaluation device to execute a method as mentioned above.

BRIEF DESCRIPTION OF THE DRAWINGS

An exemplary embodiment of the invention is now explained with respect to the attached drawing. In the drawing show FIG. 1 a schematic view from above on an airport with an aircraft in a first geographic area and a network of four ADS-B base stations for receiving an ADS-B signal emitted by a transmitter located at the aircraft.

DETAILED DESCRIPTION

Functionally equivalent elements and regions in different embodiments are denoted hereinafter with the same reference numerals.

Figure 1:
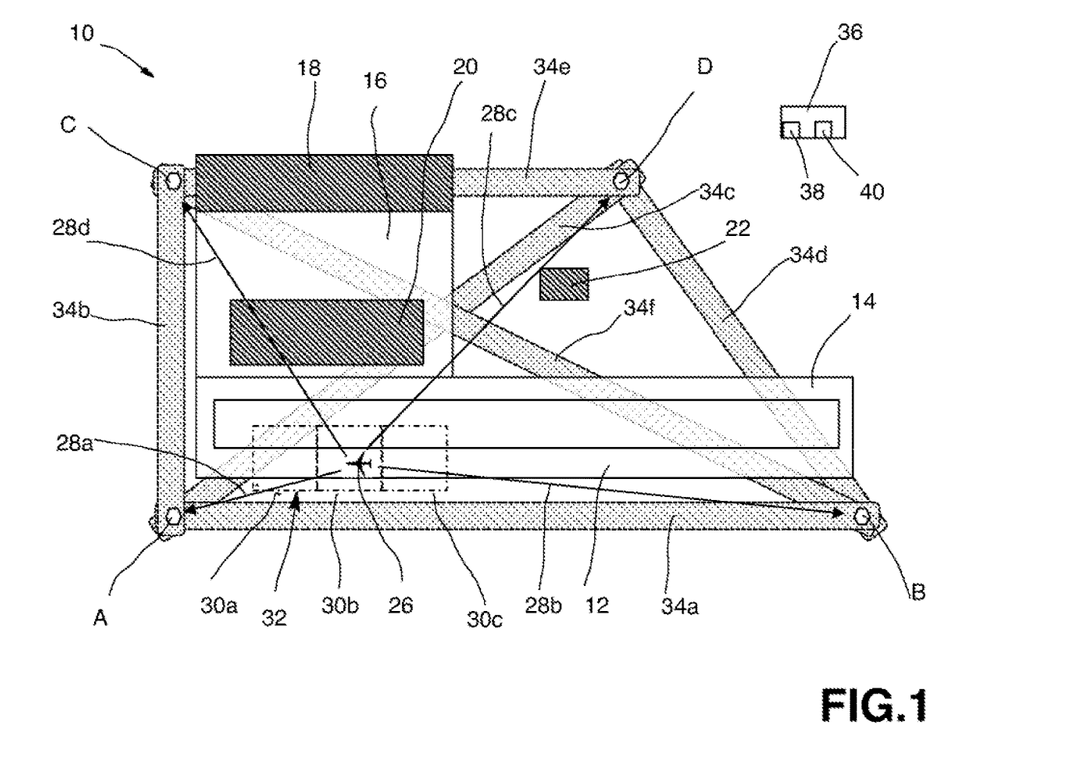

An airport in FIG. 1 is generally denoted with reference numeral 10. The airport 10 comprises a runway 12 and a taxiway 14 as well as an apron 16. Adjacent the apron 16 are two buildings 18 and 20. A further building 22 is arranged on the right side of the apron 16.

The airport comprises a network 24 which in turn comprises a plurality, that is in the present embodiment by way of example four ADS-B base stations A-D which are designed and arranged to receive an ADS-B signal. This ADS-B signal may be emitted from a transmitter (non-shown) on board of an aircraft 26. It is to be noted that in the following the reference numeral 26 may also be used for the transmitter.

While the ADS-B signal is a non-directional signal which therefore is emitted almost uniformly in all directions from the aircraft 26, in FIG. 1 the ADS-B signal emitted by the transmitter on board of the aircraft 26 towards base stations A-D is represented by directional arrows 28a-d.

ADS-B signal 28a-d includes position information of the aircraft 26. This position information is provided by an independent position acquisition means on board of the aircraft 26, such as a satellite navigation system, for example a GPS system, or an inertial navigation system, or the like. This independent position acquisition means is not represented in the drawings. Furthermore, the ADS-B signal may comprise additional information, such as an identifier which allows to identify the transmitter/the aircraft 26, altitude information, course information, speed information, position accuracy information, etc.

As can be seen from FIG. 1, the aircraft 26 is located on the runway 12 in a first geographic area 30b, which in the present exemplary embodiment is a cell 30b of a grid 32, the grid 32 consisting of square type cells 30i, wherein i=a, b, c, . . . . For the sake of clarity only cells 30a-c of the grid 32 are shown in FIG. 1. It is to be understood that grid 32 is only a virtual grid which allows to classify specific geographic areas 30a, 30b, . . . as will be shown further below. It is further to be understood that grid 32 covers all regions of the airport 10 which may be reached by an aircraft 26 or another movable object having a transmitter on board which is able to emit an ADS-B signal.

The four ADS-B base stations A-D may be combined in six pairs which are represented in FIG. 1 by dotted bars 34a-f. The combination of base stations A and B results in pair 34a, the combination of base stations A and C in pair 34b, the combination of base stations A and D in pair 34c, the combination of base stations B and C in pair 34d, the combination of base stations C and D in pair 34e, and the combination of base stations B and C in pair 34f.

The network 24 of FIG. 1 further comprises an evaluation device 36 comprising a microprocessor 38 and a storage device 40 for storing executable program code. By way of example, the evaluation device 36 may be a computer, preferably a personal computer. The evaluation device 36 is linked to all base stations A-D of network 24 in order to receive data from these base stations A-D. The evaluation device 36 may output data for example to an air traffic control device (not shown) which allows an air traffic control person to monitor and control the traffic on the airport 10. The data which are output to the air traffic control device may include information about the position of targets (for example aircraft 26) emitting ADS-B signals as well as information about the actual accuracy of the indicated position.

Figure 3:
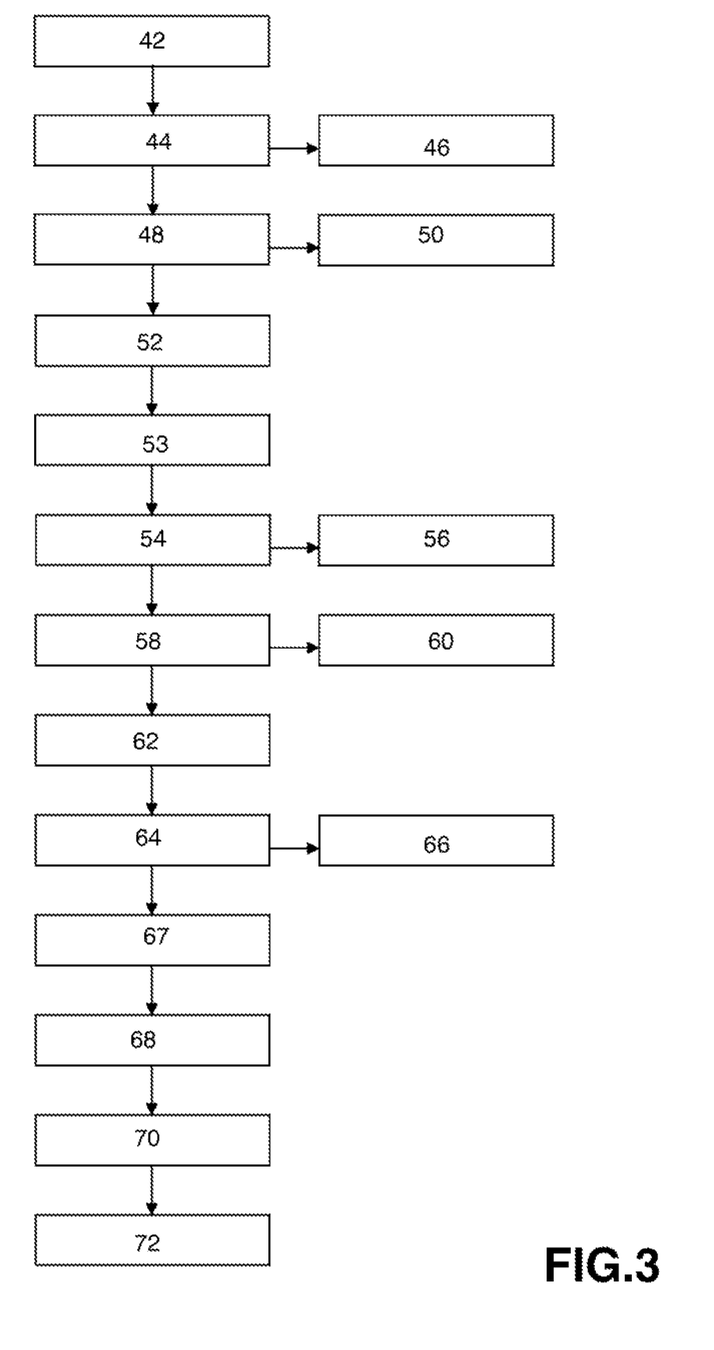
FIG. 3 a flowchart of a computer-implemented method for analyzing the network of FIG. 1.

Now reference is made to FIG. 3, which represents a flowchart of a method which is executed by the evaluation device 36. The method starts in a functional block 42, where the ADS-B signal 28a is received at the first base station A. In a subsequent functional block 44 it is evaluated whether the ADS-B signal 28a is an ADS-B signal from a plurality of ADS-B signals successively transmitted by the transmitter on board of the aircraft 26. If the answer is "no", the method is stopped in a functional block 46 and may be resumed thereafter in functional block 42.

If the answer in functional block 44 is "yes", the method continues to functional block 48 where it is evaluated whether the plurality of successive ADS-B signals, thus the amount of signals, received in functional block 42 reaches or is even above a limit value. Purely by way of example, the limit value may be 5. If the answer is "no", the method is stopped in a functional block 50 and may be resumed thereafter in functional block 42.

If the answer in functional block 48 is "yes", the method continues to functional block 52 where a first actual arrival time $TOA_{A,28a,act}$ of the ADS-B signal 28a at the first base station A is determined. Thereafter, in functional block 53 a position information $POS_{26,GPS}$ comprised in ADS-B signal 28a is extracted, this position information $POS_{26,GPS}$ being provided, as mentioned above, by means of a position acquisition means on board of the aircraft 26. It is to be understood that the above description is simplified in order to ease the understanding. In reality, the position information is sent in a so called "Compact Position Reporting". This means that two position messages, Odd and Even, are sent alternately, each with lower bit resolution than required for full accuracy. The complete (initial) position information decoding therefore requires the reception of both position messages. Once the position has been decoded, subsequent position information can be decoded using only one position message.

In the same functional block 53, accuracy information $PREC_{POS,26,GPS}$ is equally extracted from the ADS-B signal 28a. This accuracy information $PREC_{POS,26,GPS}$ indicates how accurate the position information $POS_{26,GPS}$ is. As mentioned above, such accuracy information is equally comprised in the signal and is provided by the position acquisition means on board of the aircraft 26.

In a subsequent functional block 54, it is evaluated whether the accuracy $PREC_{POS,26,GPS}$ reaches or even is below a limit value. If the answer in functional block 54 is "yes", the method is stopped in a functional block 56 and may be resumed thereafter in functional block 42. If the answer in functional block 54 is "no", the method continues to a functional block 58 where a velocity V of the aircraft 26 is evaluated.

Evaluation of the velocity of the aircraft 26 may be done by evaluating successive ADS-B signals and the position information contained therein and the time interval between the successive ADS-B signals. Alternatively, evaluation of the velocity of the aircraft 26 may be done by extracting velocity information directly comprised in the ADS-B signal and provided by a velocity information acquisition means on board of the aircraft 26. If the velocity of the aircraft 26 reaches or exceeds a limit value, that is if the answer in functional block 58 is "yes", then the method is stopped in block 60 and may be resumed thereafter in functional block 42.

If the velocity V is below the limit value, that is if the answer in functional block 58 is "no", then the method continues to functional block 62 where an MLAT-position $POS_{MLAT}$ of the transmitter on board of the aircraft 26 is determined for a number of successive signals 26a-d by means of multilateration (MLAT). The principles of position determination by multilateration are well known in the art. Generally speaking, the two-dimensional horizontal position of the aircraft 26 is mathematically calculated as the intersection of hyperboles calculated from the measured time differences of arrival of the same signal 26a-d received at the different ground receiving stations A-D.

Figure 4:
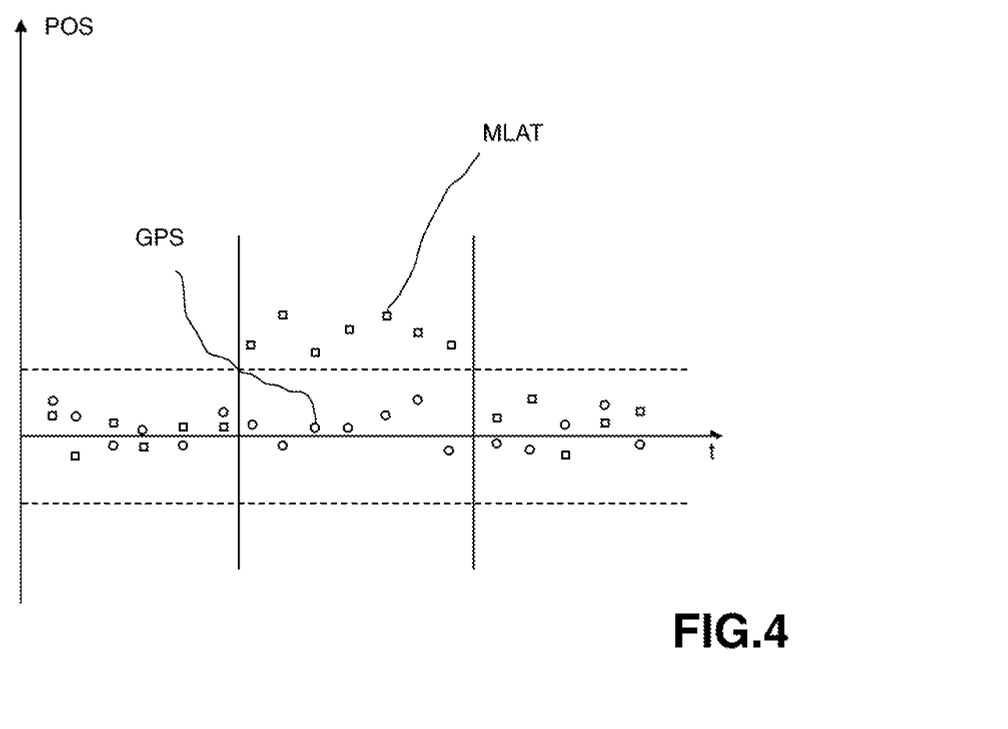
FIG. 4 a diagram which represents time of arrival errors over time for two different cases.

In a subsequent functional block 64 it is evaluated whether an average difference $DIFF_{AVG}$ between a plurality of extracted position information $POS_{GPS}$ of the ADS-B signal of the transmitter (functional block 52) and the position $POS_{MLAT}$ of the transmitter determined by multilateration in functional block 62 reaches or exceeds a limit value. With this test, it can be evaluated whether there is a type of "offset" between the extracted position information $POS_{GPS}$ (functional block 53) and the position $POS_{MLAT}$ determined by means of multilateration (functional block 62). Such an offset is visualized in FIG. 4 for a time period $t_{offset}$, where small circles indicate extracted position information $POS_{GPS}$ determined over time t and where small squares indicate positions $POS_{MLAT}$ determined by means of multilateration over time t. If the response in functional block 62 is "yes", the method stops in functional block 66, and it may be resumed thereafter in functional block 42.

Figure 2:
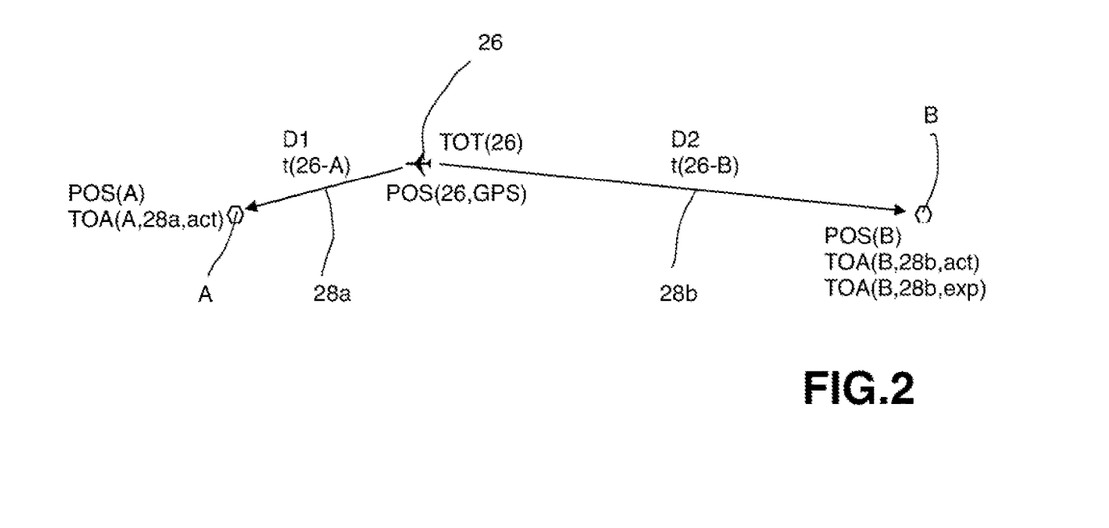
FIG. 2 a detail II of FIG. 1.

If the response in functional block 62 is "no", then the method continues to functional block 67 where an expected second arrival time $TOA_{B,28b,exp}$ of the ADS-B signal 26b at the second base station B is determined. This is done by using the extracted position information $POS_{26,GPS}$ (functional block 53), a known position $POS_A$ of the first base station A, a known position $POS_B$ of the second base station B, and the first actual arrival time $TOA_{A,28a,act}$ (functional block 52) as follows (see also FIG. 2):

With the known positions $POS_A$, $POS_{26,GPS}$, and $POS_B$ a distance D1 between the first base station A and the aircraft 26 and a distance D2 between the second base station B and the aircraft 26 can be determined. From distance D1 and the known speed of radio waves the travel time $t_{26-A}$ of the signal 28a from the aircraft 26 to the first base station A and thereafter the time of transmission $TOT_{26}$ of the signal 28a-d by the transmitter on board of the aircraft 26 can be determined. With the calculated distance D2, the known speed of radio waves, and the calculated time of transmission $TOT_{26}$ in the same way the travel time $t_{26-B}$ and the expected second arrival time $TOA_{b,28b,exp}$ can be determined, according to the following equations:

$$TOT_{26} = TOA_{A,28a,act} - t_{26-A}$$

$$TOA_{b,28b,exp} = TOT_{26} + t_{26-B}$$

In a subsequent functional block 68, a quantity ERR is determined which characterizes an error of the expected second arrival time at the second base station B. The quantity is determined by comparing the expected second arrival time $TOA_{b,28b,exp}$ with the actual second arrival time $TOA_{b,28b,act}$ at the second base station B, that is by calculating the difference between the two values. Purely by way of example, this may include the attribution of an error class to the calculated difference. By way of example, there may exist 11 error classes from 0 to 10. Class 0 means that both times perfectly match with each other. Class 10 means that both times do not match at all with each other.

In a subsequent functional block 70, all above functional blocks 42-68 are executed for the same ADS-B signal 28 from the same transmitter on board of the aircraft 26, however for the further five pairs 34b-f of base stations A-D. In the present exemplary embodiment, this finally leads in the calculation of six classified error quantities ERR.

In block 72, a significance evaluation of the classified error quantities is carried out. To this end, a matrix of the quantities ERR characterizing the errors is formed for said pairs 34a-f of base stations A-D. Purely by way of example, a possible embodiment of such a matrix is shown in FIG. 5, the matrix being denoted with reference numeral 73.

Figure 5:
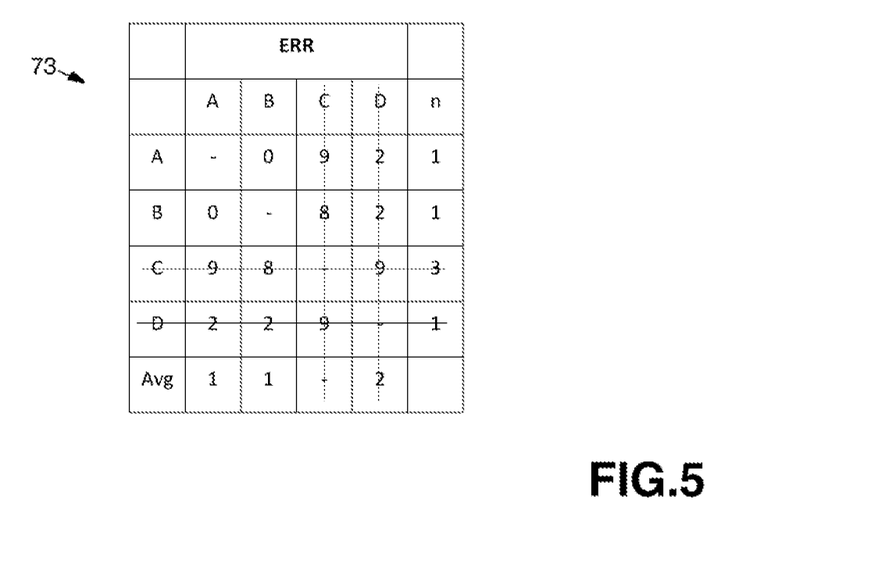
FIG. 5 a matrix for identifying specific base stations on the basis of quantities characterizing an error for the situation of FIG. 1.

As can be seen from FIG. 5, the error quantity ERR relating to the pair 34a of base stations A and B is classified "0", which means that the expected and actual times of arrival at the second base station B perfectly match. This is easily to understand because there is no obstacle located in the direct lines of sight between the aircraft 26 and both base stations A and B. In contrast hereto, the error quantity ERR relating to the pair 34b of base stations A and C is classified "9", which means that the expected and actual times of arrival at base station C almost do not match at all. This is easily to understand because there is building 20 between aircraft 26 and base station C which blocks the direct line of sight between the aircraft 26 and base station C.

The error quantity ERR relating to the pair 34c of base stations A and D is classified "2", which means that the expected and actual times of arrival at base station B match quite well with each other, but not perfectly. This is again easily to understand because a corner of building 22 is slightly protruding into the direct line of sight between aircraft 26 and base station D, such that there can be assumed that there is some reflection of the signal 28c.

The error quantity ERR relating to the pair 34d of base stations B and D is classified "2" for the same reason as mentioned above for pair 34c.

The error quantity ERR relating to pair 34e of base stations C and D is classified "9" for the same reason as mentioned above for pair 34b.

The error quantity ERR relating to pair 34f for base stations B and C is classified "8" for the same reason as mentioned above for pair 34b.

With this matrix, a base station A-D is tagged if the error related to that base station is significant. Such a significance is assumed in a first step for a base station A-D if the quantity for this base station in the matrix of FIG. 5 for at least n pairs 34a-f with other base stations reaches or exceeds a limit value. Purely by way of example, it is assumed that in the present case n is 3 and the limit value is 5. It can be seen from FIG. 5 that only base station C exceeds the limit value of 5 for all three pairs 34b (base stations C and A), 34e (base stations C and D) and 34f (base stations C and B). By consequence, base station C is tagged as presenting a significant error.

In a second step, for each of the remaining untagged base stations A, B, and D an average value Avg of the quantity characterizing the error is determined. This average value amounts to 1 for base stations A and B and amounts to 2 for base station D. In this second step, those stations are tagged whose average value of the error classes exceeds a limit value. Again, purely by way of example, it is assumed that the limit value is 1.5. It can be seen from FIG. 5 that only base station D with its average value Avg of 2 exceeds this limit value and therefore is tagged.

In functional block 72 of FIG. 3, both tagged base stations C and D are not used for a position determination of the aircraft 26 by means of multilateration when the aircraft 26 according to the position information extracted from the ADS-B signal 28 is located in the first geographic area 30 be.

It is to be understood that the above is a description of a simplified example which was chosen to make the principles of the method better understandable. According to the matrix of FIG. 3 only two base stations, namely base stations A and B, remain for carrying out multilateration of the aircraft 26 in cell 30b. In reality two base stations are too few for correctly carrying out multilateration. By consequence, in reality the network 24 would have a greater number of base stations in order to increase the likelihood that in all cells a sufficient number of base stations remains for correctly carrying out multilateration.

Figure 6:
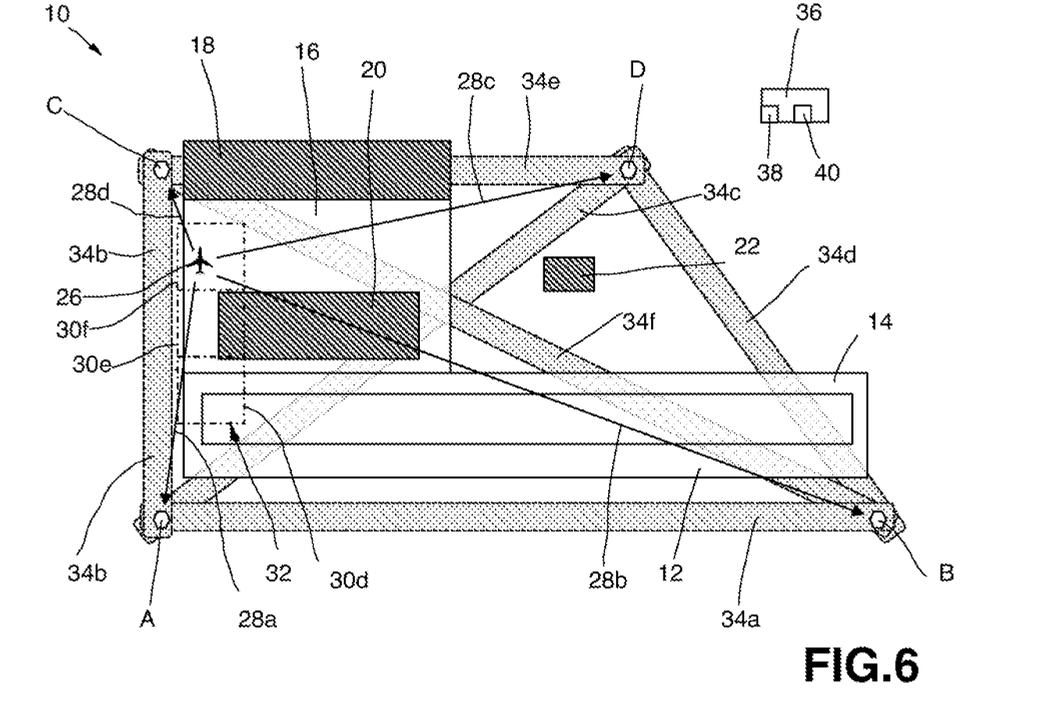
FIG. 6 a view similar to FIG. 1, wherein the aircraft is located in a second geographic area.
Figure 7:
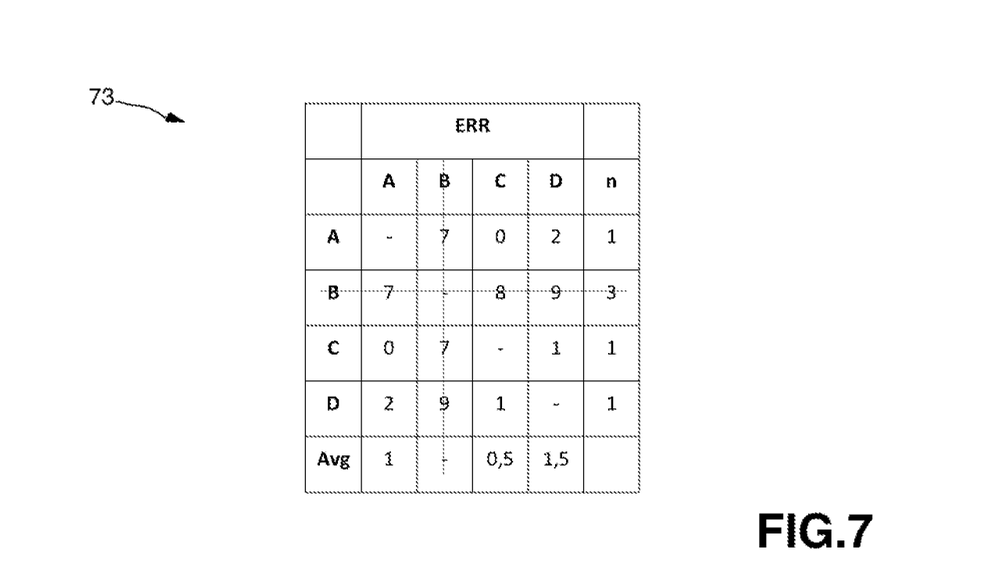
FIG. 7 a matrix similar to FIG. 3 for the situation of FIG. 5.

The method according to functional blocks 42-72 is carried out additionally for different locations of the aircraft 26 on the airport 10, that is also for other cells 30 of grid 32. Again, purely by way of example, FIG. 6 represents a situation where the aircraft 26 is no more located on runway 12 but on apron 16 between buildings 18 and 20. As can be seen from FIG. 6, the aircraft 26 now is in cell 30f of grid 32. FIG. 7 represents the matrix of the error classes which is obtained in functional block 72 of the method of FIG. 3 for the situation of FIG. 6.

It can be seen from FIG. 7 that for the aircraft 26 in its cell 30f of grid 32 in the first step of the significance evaluation only base station B exceeds the limit value of 5 for all three pairs 34b, 34b and 34f of base stations A-D. By consequence, in this first step of the significance evaluation base station B is tagged as presenting a significant error. In the second step of the significance evaluation again the average value Avg of the error classes is calculated for each base station A-D and its pairs with the other base stations A-D.

It can be seen from FIG. 7 that none of the average values Avg of the error classes of the remaining untagged base stations A, C, and D exceeds the limit value of 1.5. By consequence, in this second step of the significance evaluation no additional base station is tagged. Finally, for an aircraft 26 in cell 30f of grid 32 only base station B is tagged and therefore not used for a position determination by means of multilateration.

Figure 8:
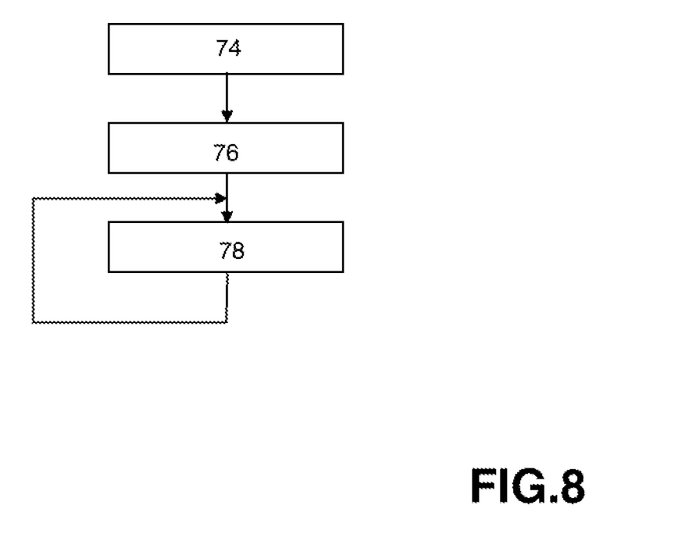
FIG. 8 a flowchart of different execution scenario of the method of FIG. 3.

According to functional block 76 of the method of FIG. 8, the above mentioned method may preferably be executed immediately after the initial startup (functional block 74) of the network 24 until for each cell 30i (i=a, b, c, ...) of grid 34 it is determined which base stations A-D can be used for multilateration. This information is stored in the evaluation device 36 and automatically used during normal operation of the network 24.

However, the above-mentioned method may also be carried out repeatedly or continuously during normal operation of the network 24, as is indicated by functional block 78 in FIG. 8. When doing so, it can be determined whether a base station A-D has been newly tagged which was previously untagged, and it can be determined whether a base station A-D is no more tagged which was previously tagged. Such a change of the status "tagged" to "untagged" of a base station A-D and vice versa may result from objects which only temporarily block and/or reflect the signal 28 between the aircraft 26 and one or more of the base stations A-D. Such objects may be other aircraft, ground vehicles, construction sites, etc. If such a change of the status is detected, evaluation device 36 issues a message which informs a user/operator of the network 24 that in a specific cell 30i of grid 32 the situation with respect to multilateration has changed.

REFERENCE SIGNS

10 airport
12 runway
14 taxiway
16 apron
18 building
20 building
22 building
24 network
26 aircraft
28a-d ADS-B signal
30 a-c cells of grid
32 grid
34a-f pairs of base stations
36 evaluation device
38 microprocessor
40 storage device
42 acquiring signal 28a at base station A
44 signal 28a=signal from a plurality of subsequent signals?
46 stop
48 plurality above a threshold?
50 stop
52 $TOA_{A,28a,GPS}$
53 extract position information
54 evaluate position information accuracy
56 stop
58 evaluation of velocity
60 stop
62 determination of MLAT-position
64 evaluation of average difference between extracted position and MLAT-position
66 stop
67 determination of expected second arrival time
68 determination of quantity characterizing an error
70 execution of blocks 42-68 for other pairs of base stations
72 significance evaluation
73 matrix
74 initial startup
76 initial execution of method
78 repeated execution of method

What is claimed is:

1. A computer-implemented method for analyzing a network comprising a plurality of automatic dependent surveillance-broadcast (ADS-B) base stations, wherein a synchronized clock system is used by all base stations of the network, the method comprising the following steps:
    a. receiving an ADS-B signal from a transmitter located in a first geographic area at a first base station and determining a first arrival time of the signal at the first base station;
    b. extracting position information of the transmitter from the ADS-B signal received at the first base station;
    c. determining an expected second arrival time of the ADS-B signal at a second base station, synchronized with the first base station, using the extracted position information of the transmitter extracted from the ADS-B signal received at the first base station, the position of the first base station, the position of the second base station and the first arrival time of the ADS-B signal at the first base station;
    d. determining a quantity characterizing an error from a comparison of the expected second arrival time of the ADS-B signal at the second base station with an actual second arrival time of the ADS-B signal at the second base station;
    e. performing steps a-d for the same ADS-B signal from the same transmitter and further pairs of first and second base stations of the network,
    f. tagging a base station if the quantity characterizing the error related to that base station has reached and/or has surpassed a threshold,
    wherein position information of the transmitter located in the first geographical area is determined by means of multilateration without using the tagged base station.

2. The method according to claim 1, wherein accuracy information on the position information is extracted from the ADS-B signal, and wherein the ADS-B signal is used for steps c-f if the accuracy information exceeds a limit value.

3. The method according to claim 1, wherein a velocity of the transmitter is determined, and wherein the ADS-B signal is used for the steps c-f if the determined velocity falls below a limit value.

4. The method according to claim 1, wherein the ADS-B signal is not used if (a) it is not an ADS-B signal from a plurality of ADS-B signals successively transmitted by the transmitter and/or if (b) the plurality reaches or falls below a limit value.

5. The method according to claim 1, wherein the ADS-B signal is used if an average difference between a plurality of extracted position information of the ADS-B signal of the transmitter and the position information of the transmitter determined by multilateration falls below a limit value.

6. The method according to claim 1, wherein in step f a matrix of the quantities characterizing the error is formed for the pairs of base stations used and a significance is assumed for a base station if the quantity for at least n pairs of this base station with other base stations reaches or exceeds a limit value.

7. The method according to at least claim 6, wherein for each of the untagged base stations an average value of the quantities characterizing the error is determined and those base stations whose average value reaches or exceeds a limit value are tagged.

8. The method according to claim 1, wherein the method is carried out for a plurality of geographical areas and wherein only those base stations are used for multilateration in a specific geographic area which are not tagged in this area.

9. The method according to claim 1, wherein the method is performed immediately after an initial start-up of the network.

10. The method according to claim 1, wherein the method is carried out repeatedly or continuously during normal operation of the network, and wherein when it is determined that a base station has been tagged which was previously untagged and/or when it is determined that a base station is no longer tagged which was previously tagged, a message is issued.

11. A network comprising a plurality of ADS-B base stations (A-D) and comprising an evaluation device, which comprises a microprocessor and a storage device for storing executable program code, characterized in that the evaluation device is arranged and designed to execute a method according to claim 1.

12. An evaluation device comprising a microprocessor and a storage device for storing executable program code, characterized in that the evaluation device being arranged and designed to execute a method according to claim 1.

* * * * *